(12) United States Patent  
Briesemeister et al.

(10) Patent No.: US 7,536,848 B2
(45) Date of Patent: May 26, 2009

(54) ARTICLE PICKUP APPARATUS

(75) Inventors: Richard A. Briesemeister, Clear Lake, WI (US); George Arthur Michaels, Kent, NY (US); Bryn Briesemeister, Clear Lake, WI (US); Christopher M. Schloesser, Hudson, WI (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 11/594,052

(22) Filed: Nov. 6, 2006

(65) Prior Publication Data
US 2007/0137162 A1    Jun. 21, 2007

Related U.S. Application Data

(63) Continuation-in-part of application No. 10/897,384, filed on Jul. 13, 2004, now abandoned.

(51) Int. Cl.
*A01D 46/00*    (2006.01)
(52) U.S. Cl. .......................................... 56/328.1; 15/84
(58) Field of Classification Search ............... 15/83, 15/84, 79.2, 345, 347, 340.1; 171/89, 63; 414/440; 56/328.1, 364, 344
See application file for complete search history.

(56) References Cited

U.S. PATENT DOCUMENTS

| | | |
|---|---|---|
| 703,194 A | 6/1902 | Hansbury |
| 1,035,613 A | 8/1912 | Lint |
| 1,104,431 A | 7/1914 | Lint |
| 1,136,249 A | 4/1915 | Lint |
| 1,191,814 A | 7/1916 | Murrah |
| 1,277,715 A | 9/1918 | Griffin |
| 1,439,266 A | 12/1922 | Shaw |
| 1,859,980 A | 5/1932 | Mueller |
| 2,482,355 A | 9/1949 | McBride |
| 2,599,715 A | 6/1952 | Lepper |
| 2,701,889 A | 2/1955 | Riddell |
| 2,778,184 A | 1/1957 | Beok et al. |
| 2,928,225 A | 3/1960 | Spencer |
| 3,186,015 A * | 6/1965 | Beyerstedt ................ 15/84 |
| 3,324,640 A | 6/1967 | Attebery |
| 3,670,359 A * | 6/1972 | Gutbrod ................ 15/348 |
| 3,746,099 A | 7/1973 | Black |
| 3,780,511 A | 12/1973 | Avis |
| 3,807,154 A | 4/1974 | Moore |
| 3,825,968 A * | 7/1974 | Larsen ................ 15/87 |
| 3,888,370 A | 6/1975 | Gamblin |

(Continued)

Primary Examiner—Árpád Fábián-Kovács
(74) Attorney, Agent, or Firm—Merchant & Gould P.C.

(57)    ABSTRACT

An article pickup system includes a pickup vehicle having collector assemblies extending in a side by side configuration and engaging articles on the ground. The collector assemblies generally include a rotating drum with flexible fingers having widened ends extending outward there from. A separator assembly includes sprocket type devices to remove the collected articles from the collector assemblies. In one embodiment, the collector assemblies pivot independently from one another and the separator assemblies are mounted on a linkage to maintain spacing and move upward and downward with the collector assemblies. The collector assembly includes a series of conveyors for transporting the collected fruit. The collector assemblies may be utilized with a sweeper device having generally horizontally extending arms that engage fruit on the ground and move it toward the collector assemblies with the arms raising up to release the fruit in the desired location in the path of the collector assemblies.

27 Claims, 17 Drawing Sheets

U.S. PATENT DOCUMENTS

| | | | |
|---|---|---|---|
| 3,993,141 A | 11/1976 | Donohue | |
| 4,066,179 A | 1/1978 | Livingston | |
| 4,199,923 A | 4/1980 | Blake | |
| 4,546,602 A | 10/1985 | Cosimati | |
| 4,550,465 A | 11/1985 | Chrisley | |
| 4,557,010 A * | 12/1985 | Rosseau | 15/83 |
| 4,561,240 A * | 12/1985 | Moore et al. | 56/328.1 |
| 4,593,426 A * | 6/1986 | Chrisley | 15/84 |
| 4,603,544 A | 8/1986 | Hayhurst | |
| 4,608,725 A | 9/1986 | Jackson | |
| 4,843,561 A * | 6/1989 | Larson | 700/213 |
| 5,025,620 A | 6/1991 | Dudley | |
| 5,168,692 A | 12/1992 | Dudley | |
| 5,247,717 A | 9/1993 | Smith | |
| 5,257,888 A | 11/1993 | Kroseder | |
| 5,339,612 A | 8/1994 | Scott | |
| 5,361,441 A * | 11/1994 | Williamson | 15/84 |
| 5,542,148 A * | 8/1996 | Young | 15/346 |
| 5,630,476 A | 5/1997 | Foster et al. | |
| 5,745,947 A | 5/1998 | Liu et al. | |
| 5,850,656 A | 12/1998 | Smith et al. | |
| 7,083,039 B2 * | 8/2006 | Schloesser | 198/496 |

* cited by examiner

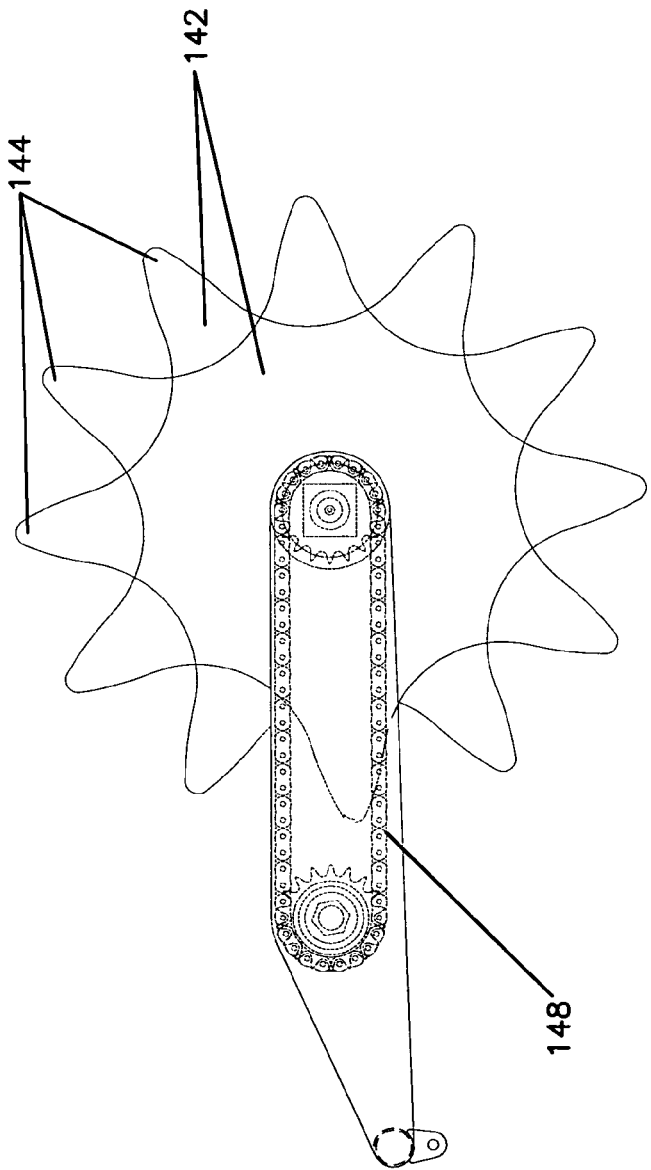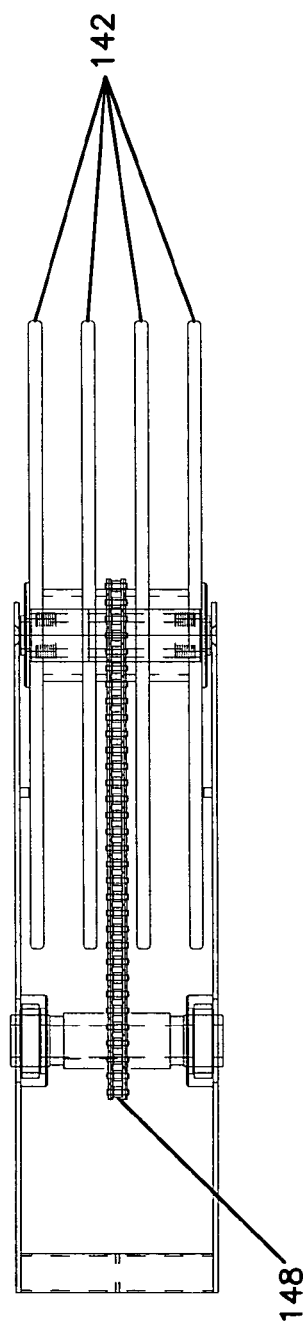
FIG. 11
FIG. 12

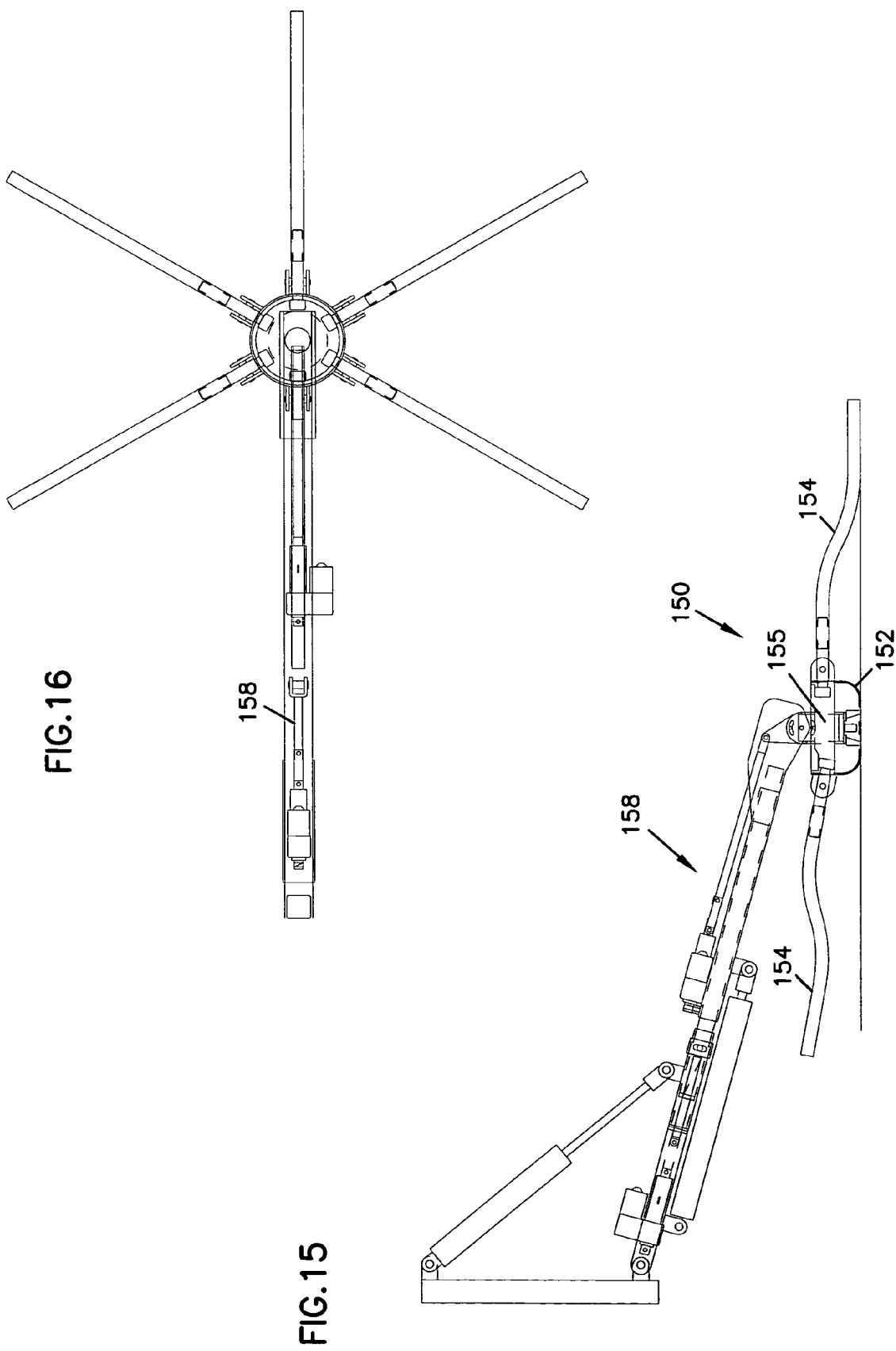

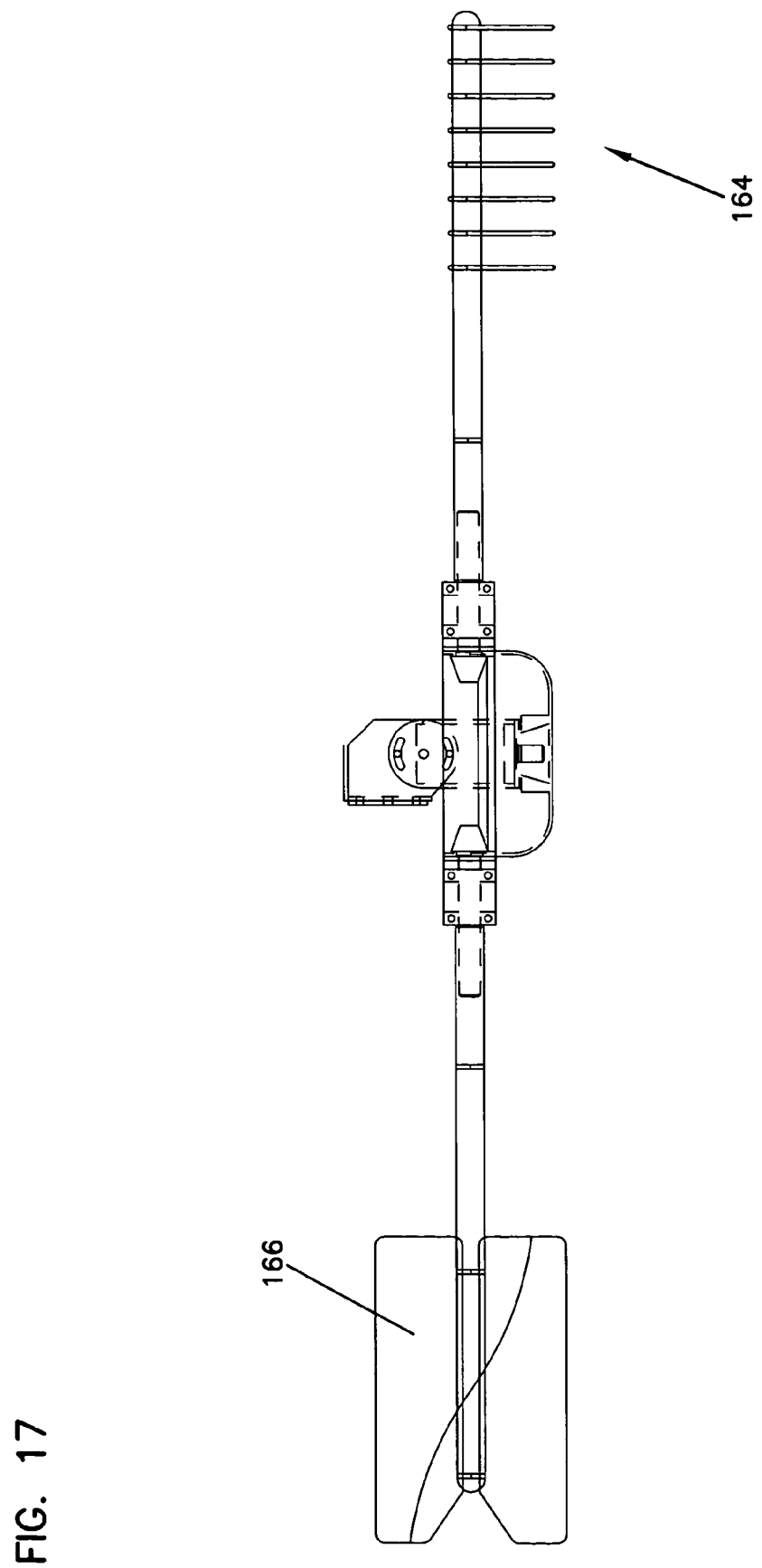

ARTICLE PICKUP APPARATUS

This application is a Continuation-in-Part of U.S. patent application Ser. No. 10/897,384, filed Jul. 13, 2004, currently pending.

BACKGROUND OF THE INVENTION

1. Field of the Invention

The present invention relates to an article pickup and cleaning system and in particular to a system for picking up dislodged citrus fruit on the ground.

2. Description of the Prior Art

Devices for picking up substantially round articles such as fruit, nuts, golf balls and other articles that are dispersed on the ground are well known. Such devices are often configured as rotating drum type assemblies having elements extending radially outward that engage and retain the articles and lift them from the ground. Such devices have proven to be generally satisfactory for picking up many types of articles over smooth ground. When the articles have a consistent size, the pickup configuration can be optimized to match the particular size of the articles. However, greater difficulty is encountered and performance is decreased when items are picked up that vary in size and the ground is uneven. The pickup system must be able to accommodate items in a range of sizes so that a higher percentage is picked up. In addition, once the articles are lifted from the ground, they must be separated from the pickup device. Where the items have a consistent size, this is relatively straight forward. However, when items vary in size, picking up, then separating articles from the collector without damaging the articles is challenging. Problems may occur with jamming or with articles being separated but not collected as some items fall back to the ground.

Examples of prior art pickup devices are shown in U.S. Pat. Nos. 5,025,620; 5,168,692; 1,859,980; 2,482,355; 3,888,370; 1,035,613; 1,104,431; 1,439,266, 3,746,099; 1,136,249; 1,191,814; 1,277,715; 4,066,179; 3,993,141 and 2,778,184. Although such pickup devices generally are satisfactory for picking up and collecting articles, such devices do not have a wide swath and do not work well over uneven terrain with ridges, bumps, ruts, holes, swales and other irregularities.

Once articles have been collected from the ground, it is advantageous to remove debris material from the desired crop early in the collection and transport process. Removal of debris such as twigs and leaves at an early stage of collection has several advantages. By removing debris, jamming and wear on the equipment are reduced as the equipment is typically not designed for transporting leaves, twigs and other unwanted material. The cost of handling this debris is reduced and the capacity is increased if the debris is removed prior to being transported by other equipment. Moreover, automated removal of the debris at an early stage reduces the equipment needed to clean the crop at a later stage in processing. In some cases, manual inspection is required, so that early automated removal of leaves and other debris may reduce labor costs associated with inspecting and removal of unwanted materials at a processing plant.

Although blowers and other devices for removing twigs, rocks, leaves and other debris improve the overall quality of the harvested crop, still further improvements are possible. Prior art cleaning systems have typically been complicated and expensive and require substantial reconfiguration of the harvesting equipment to accommodate the cleaning system. Such cleaning systems may also be subject to jamming and struggle to separate and remove unwanted debris while allowing continuous transport of the harvested crop.

It can be seen then that a new and improved system for collecting and removing debris from articles on the ground such as an agricultural crop is needed. Such a system should provide a wide swath that directs articles to a collection system. Such a system should efficiently function over uneven terrain and collect a high percentage of the fallen crop. Such a system should also pick up a high percentage of the crop with a single pass without jamming. Moreover, such a system should provide for automated removal of unwanted materials from the collected crop at an early stage. The present invention addresses these problems, as well as others associated with mechanized agricultural collectors and cleaning systems.

SUMMARY OF THE INVENTION

The present invention is directed to an article pickup system and more particularly to a pickup system suited for use with citrus fruit. In one embodiment, the pickup system includes a pickup or collection vehicle generally having a cab, frame, engine and front and rear wheels. In another embodiment, the pickup system may be mounted to the rear of a harvester. A pickup vehicle is generally used with separate transport vehicles having a larger capacity than the pickup vehicle so that as the fruit is collected, it may be loaded into the transport vehicle or several transport vehicles servicing the pickup vehicle so that collection may continue in an uninterrupted manner. The pickup vehicle has a holding bin for temporary storage of the collected articles.

The pickup vehicle includes collector assemblies having rotating drums with axes extending generally transverse to a direction of travel. The drums include flexible pickup fingers extending radially outward across and around the drum. The pickup fingers include ball-type widened end portions that provide for extending partially around and retaining the fruit so that it may be lifted before being separated and passed on to a conveying system. The separator assembly may take on many configurations, but in one embodiment includes sprocket type elements extending between the pickup fingers. The sprocket type elements are driven to rotate and engage the fruit and force the pickup fingers outward to separate and allow the fruit to be dislodged from the pickup fingers. The sprockets are generally located above the collector assembly drums so that the fruit falls downward onto transport conveyors or augers.

In one embodiment, the collector assemblies are pivotally mounted independently of one another so that each individual collector may closely follow the terrain. Pivot arms provide for one or more sets of axially aligned fingers from an individual drum to pass into swales or ruts while others of the individual collector assemblies are able to ride up and over raised projections. In this manner, greater contact is maintained with the ground and a higher percentage of fruit is collected. The individually pivotally mounted collector assemblies have separator assemblies that may include sprocket type members for inserting between the pickup fingers and loosening collected fruit. It can be appreciated that in order to maintain the proper distance so that the separator assemblies function properly, the separator assemblies must also be pivotally mounted in the same manner as the individual collector assemblies. Moreover, to maintain the spacing for proper operation, the collector assemblies and associated separator assemblies are connected by a parallel linkage. Therefore, as the collector assemblies pivot up and down, the associated separator assemblies pivot up and down in a similar parallel manner with the same amplitude to maintain a constant distance to ensure proper operation.

The loosened fruit generally falls onto an auger or conveyor that transports it to one or more other conveyors and to the holding bin of the collection vehicle or to the transport vehicles. Debris may be removed with a cleaner device prior to the fruit being delivered to the holding bin or transport vehicle. In one embodiment, the transport device uses rotating brushes. The brushes have bristles that have a selected rigidity, length and spacing that allows for the collected fruit to fall downward between the brushes while debris such as twigs or leaves is generally lighter and is flung outward away from the collected fruit upon engaging the tops of the parallel and horizontally extending brushes. The brushes may be positioned at any point along the transport path that allows the fruit and debris to fall onto the brushes and allows for the debris to be directed to a different path than the fruit.

For some applications, a wider path is needed than provided by a rotating drum or drums at the front of the collection vehicle. Side collector assemblies mounted on one or both sides and extending laterally outward from the collection vehicle may be utilized. The primary collector assemblies may be in the form of rotating drums and utilize a transverse conveyor or auger to merge fruit from the side collector assemblies with the fruit collected from the primary collector assemblies mounted at the front of the pickup vehicle.

The pickup system may also utilize sweeper type devices that have substantially horizontally extending rotating arms, rotating about a center hub. The arms sweep the fruit in the sweeper device's path inward into the path of the primary collector assemblies where the arms lift up to disengage the fruit and leave it for the collector assemblies to pick up. The sweeper assemblies may utilize arms to engage the fruit or have flaps, rakes, brushes or other elements mounted along the arms to engage or move the fruit. The sweeper assemblies generally float on the center hub to maintain contact with the ground. The support assembly for the sweepers is adjustable and may be controlled and adjusted while operating by a joystick or other controls by the operator.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring to the drawings, wherein like reference numerals and letters indicate corresponding structure throughout the several views:

FIG. 11 is a side elevational view of the separator assembly drive for the article collector and separator assembly shown in FIG. 4;

FIG. 12 is a top plan view of the separator assembly drive shown in FIG. 11;

FIG. 15 is a side elevational view of a sweeper assembly for the pick up system of FIG. 1;

FIG. 16 is a top plan view of the sweeper assembly of FIG. 15;

FIG. 17 is a side elevational view of an alternate embodiment of a sweeper assembly for the pick up system of FIG. 1;

DETAILED DESCRIPTION OF THE PREFERRED EMBODIMENT

Figure 1:
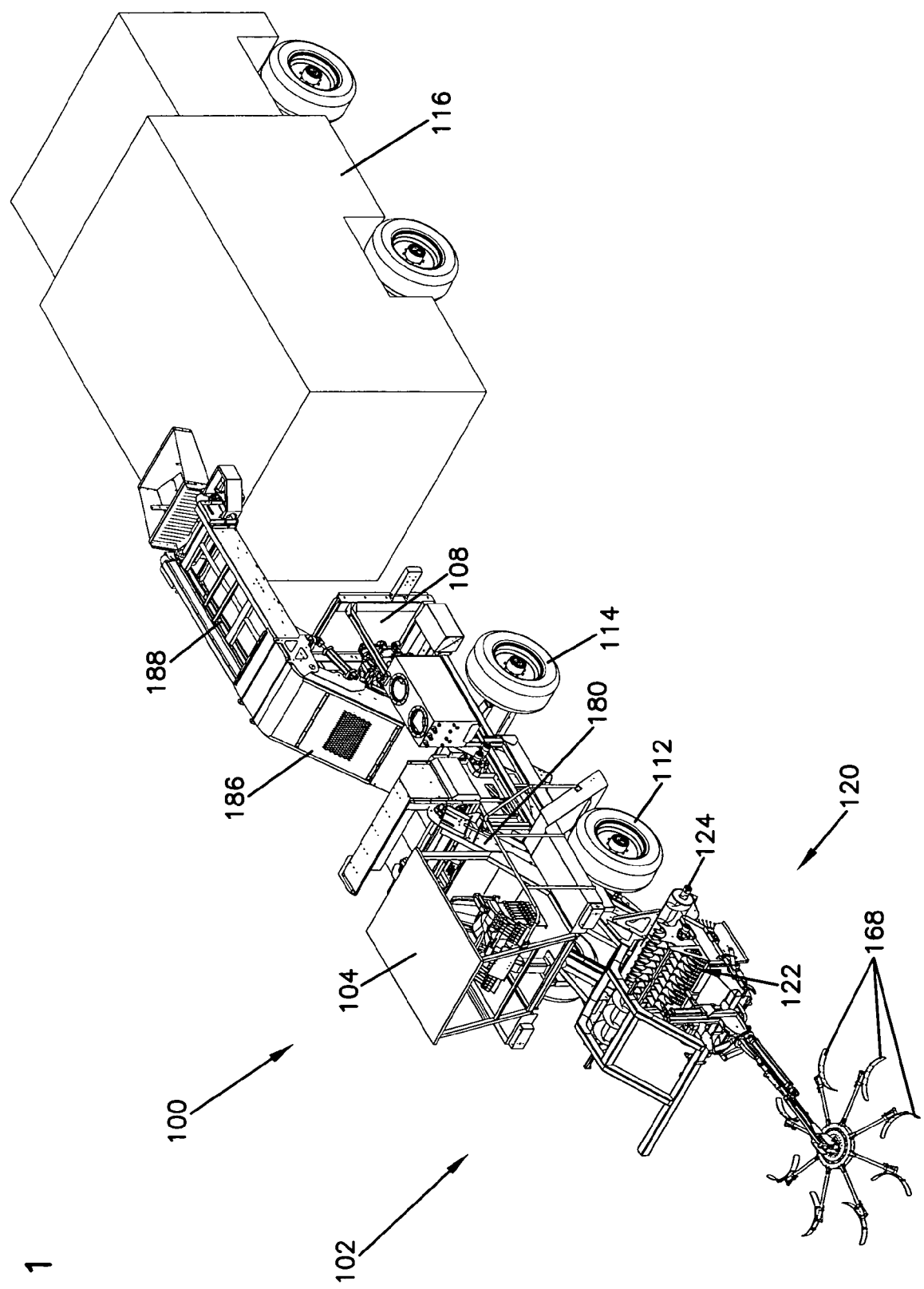
FIG. 1 is a perspective view of an article pick up system according to the principles of the present invention.
Figure 2:
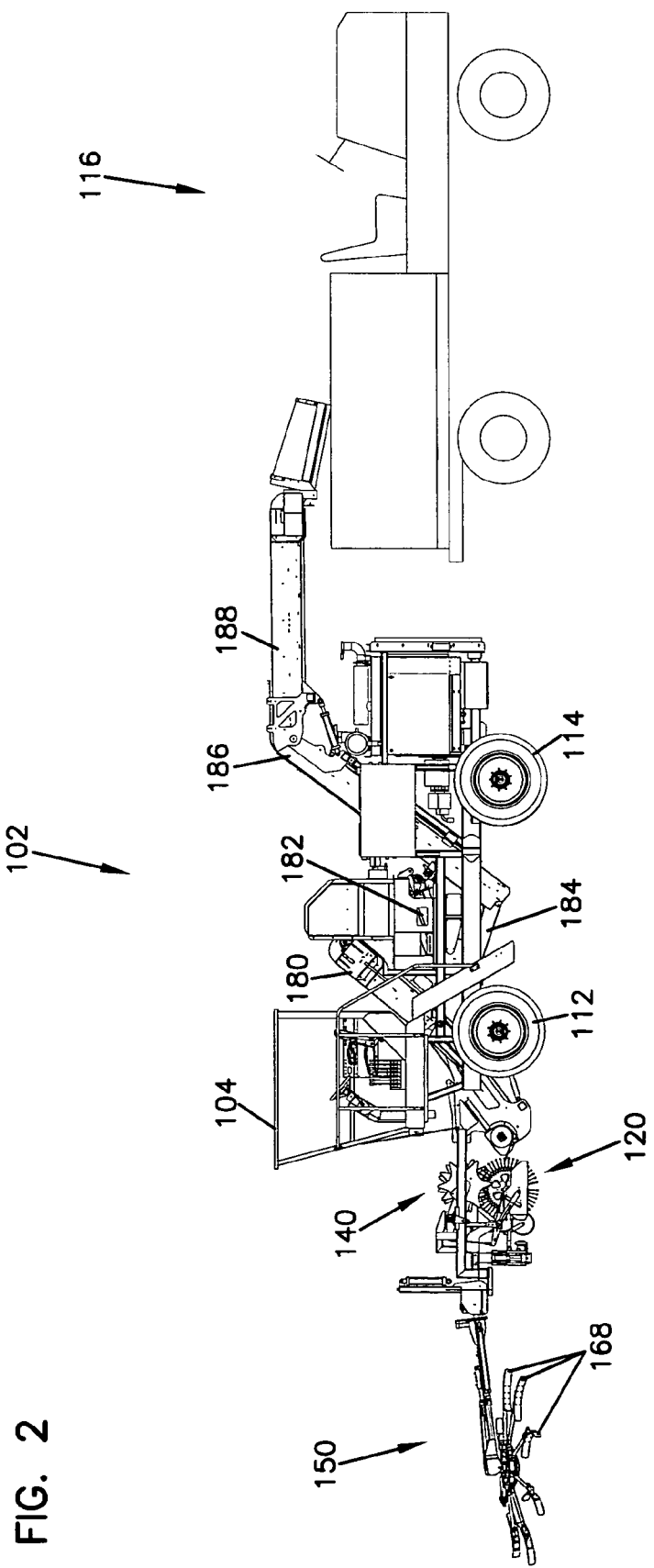
FIG. 2 is left side elevational view of the article pick up system shown in FIG. 1.
Figure 3:
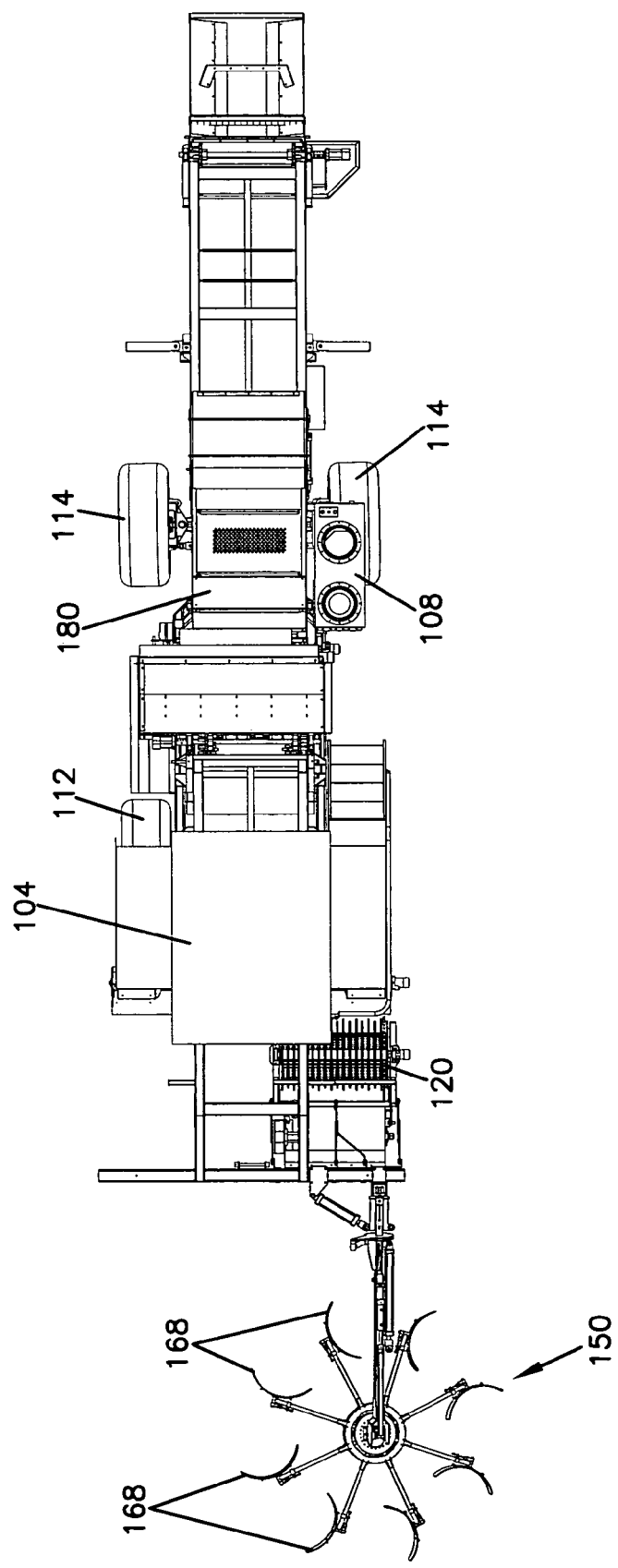
FIG. 3 is a top plan view of the article pick up system shown in FIG. 1.

Referring now to the drawings, and in particular FIGS. 1-3, there is shown an article pickup system, generally designated 100. The article pickup system 100 is generally configured for picking up fallen fruit such as citrus fruit but it can be appreciated that the system may be used for picking up other articles from the ground. The pickup system 100 includes a pickup or collection vehicle 102 that loads into a transport vehicle 116, shown in FIG. 3, to collect and transport the fruit to a processing plant or other location. The pickup vehicle 102 generally includes a frame, a cab 104 and an engine 108. The vehicle is supported on front wheels 112 and steerable rear wheels 114. A holding bin retains collected fruit until the fruit is transferred to a transport vehicle 116. It can also be appreciated that the pickup vehicle 102 may work in tandem with a larger capacity transport vehicle 116 and load continuously into the holding vehicle 116 or unload when the holding bin is full.

At the front of the pickup vehicle 102 is an article pickup arrangement 120 that may take on several configurations extending wider than the vehicle, such as the configuration shown in FIG. 3. The pickup arrangement 120 may include multiple different primary collection assemblies 122 that may be utilized in various configurations depending upon the conditions and the terrain over which the vehicle 102 passes. The fruit is generally passed from the pickup arrangement 120 by a transverse auger 124 and then to conveyors 180, 182, 186 and 188, shown most clearly in FIGS. 1 and 2. However, it can be appreciated that depending upon the use of a transport vehicle 116, other conveying configurations may be utilized.

Referring now to FIGS. 4-7, collector assemblies 122 are utilized in a first embodiment of the invention. The collector assemblies 122 each include rotating drums 134 with pickup fingers 130 extending outward from and spaced along and around the drums 134. The pickup fingers 130 have widened spherical outer end portions 132. The fingers 130 flex so that the articles lodge between the spread pickup fingers 130 and retained by the widened end portions 132 until dislodged by separator assemblies 140, shown in FIGS. 4-9 and 11-12 and explained hereinafter. The collector assemblies 122 engage and retain the fruit while the fruit is raised until the fruit is dislodged by the separator assemblies 140 and the fruit falls onto a transverse auger or conveyor 124 for delivery to the conveyor 180.

The article collection assemblies 134 include a series of individually pivotally mounted moving drum segments 136. Each of the segments 136 is mounted on an associated pivot arm 176 as part of a pivot linkage 174. The pivot linkage 174 ensures that the associated separator assembly 140 pivots as the collector assembly 122 pivots to maintain the spacing between the collector assemblies 122 and the separator assemblies 140.

Figure 5:
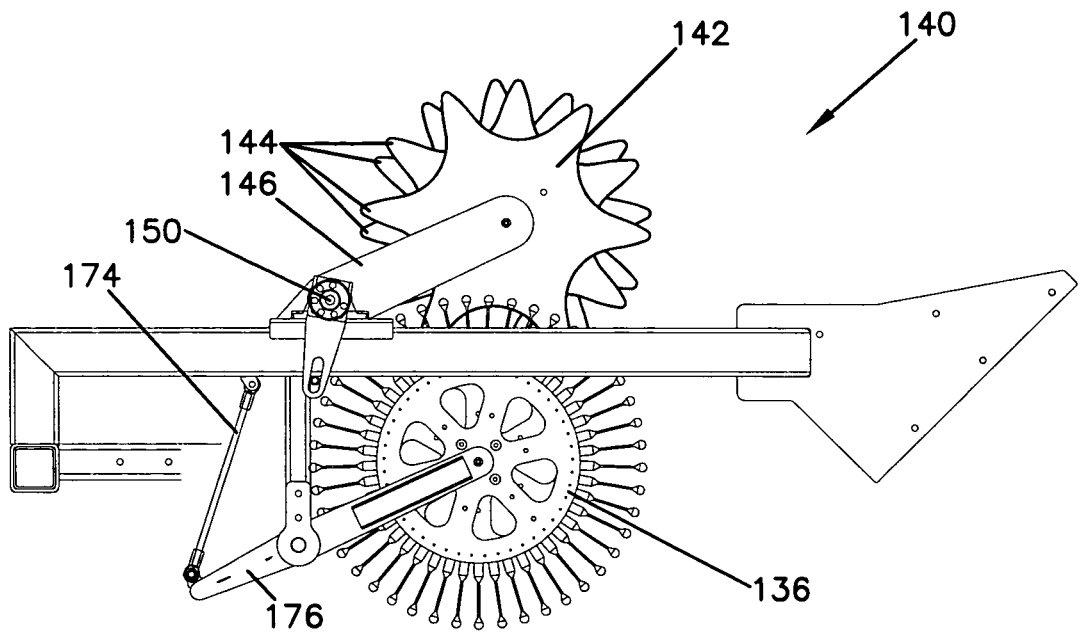
FIG. 5 is a left side elevational view of the article collector and separator assembly shown in FIG. 4 with a drum at a raised position.
Figure 6:
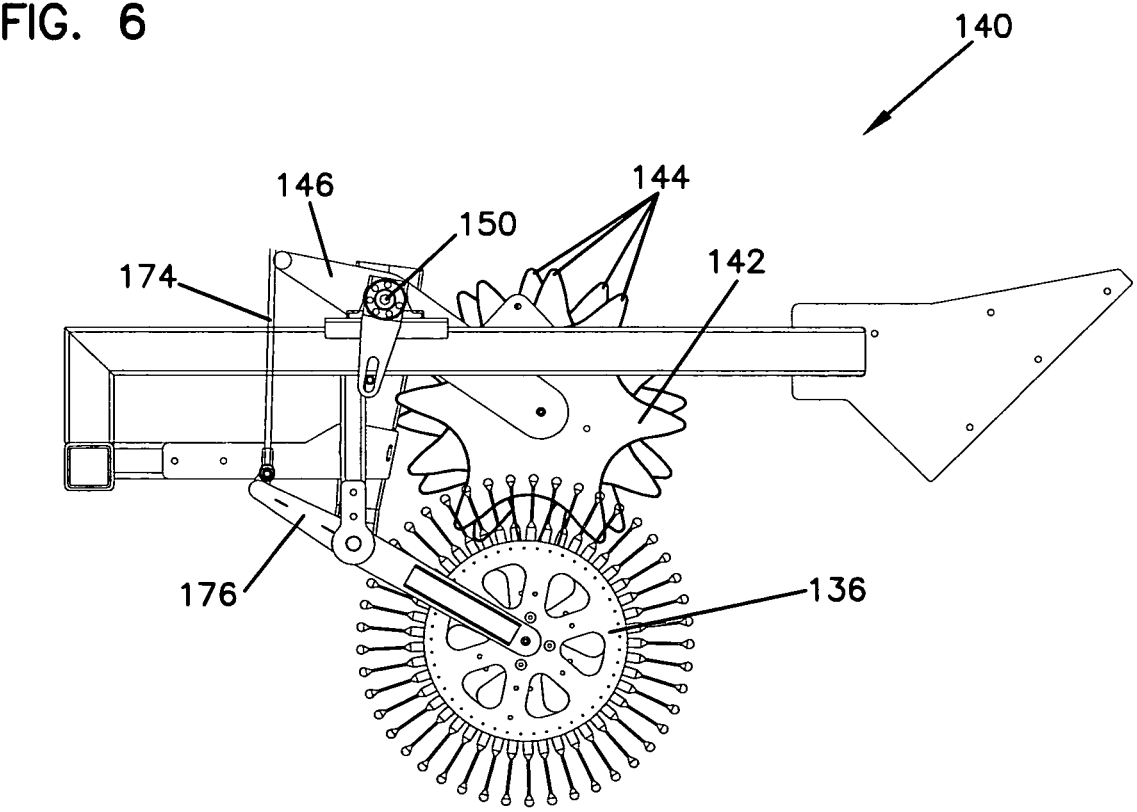
FIG. 6 is a left side elevational view of the article collector and separator assembly shown in FIG. 4 with a drum at a lowered position.
Figure 8:
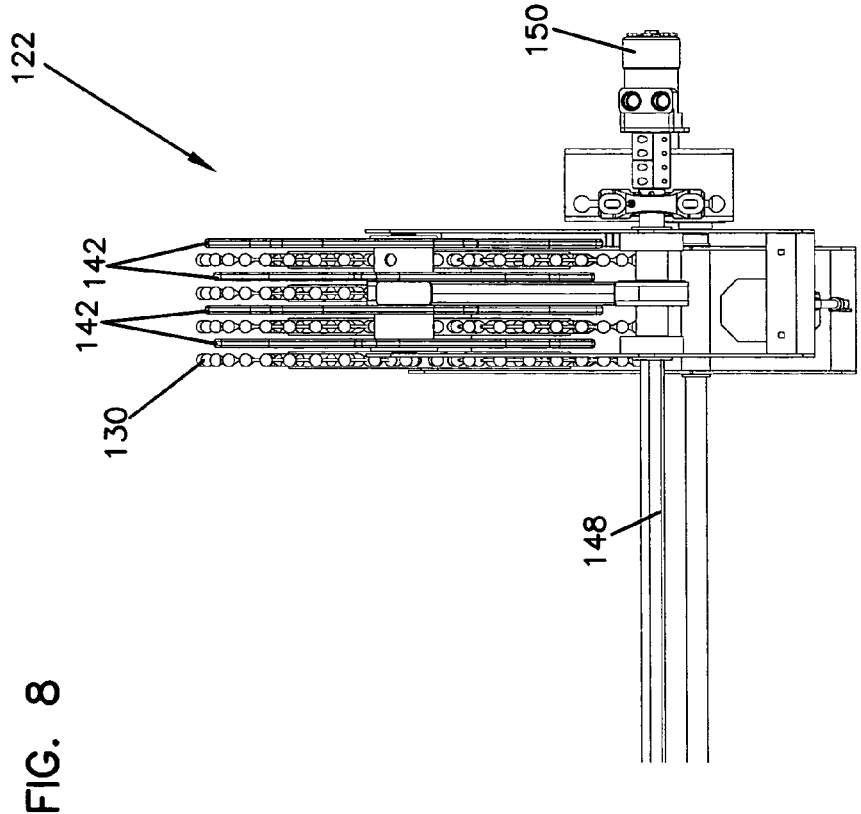
FIG. 8 is a top plan view of the segment of the article collector and separator assembly shown in FIG. 7.
Figure 7:
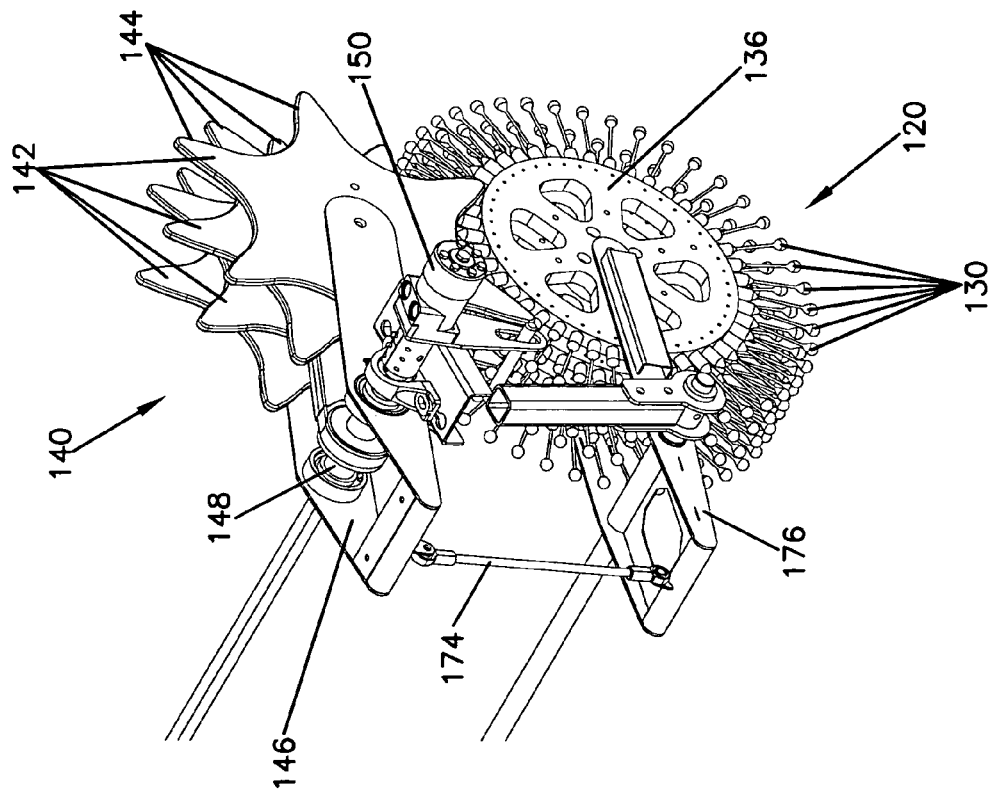
FIG. 7 is a perspective view side elevational view of a segment of the article collector and separator assembly shown in FIG. 4.
Figure 9:
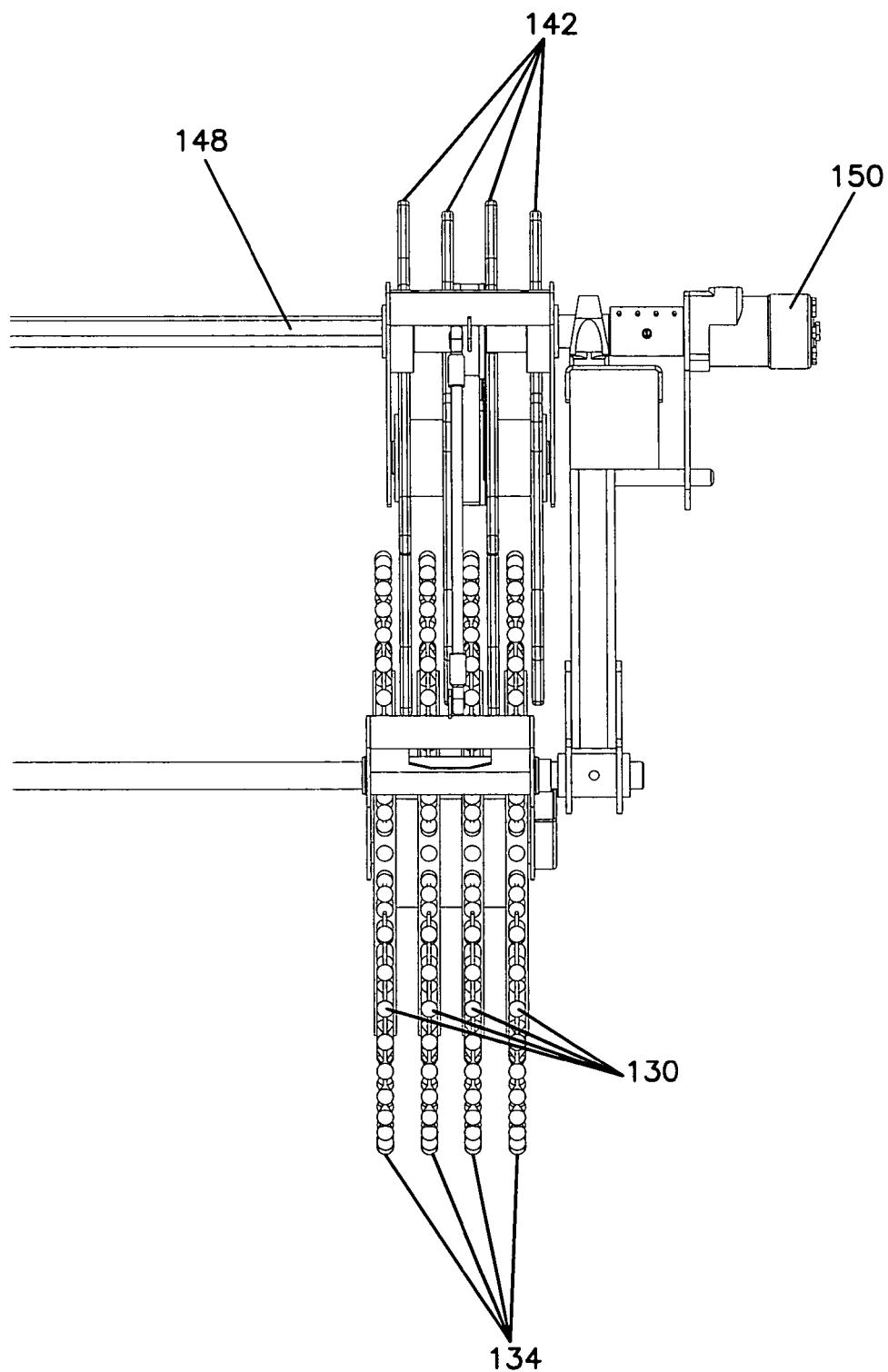
FIG. 9 is a front elevational view of the segment of the article collector and separator assembly shown in FIG. 7.
Figure 10:
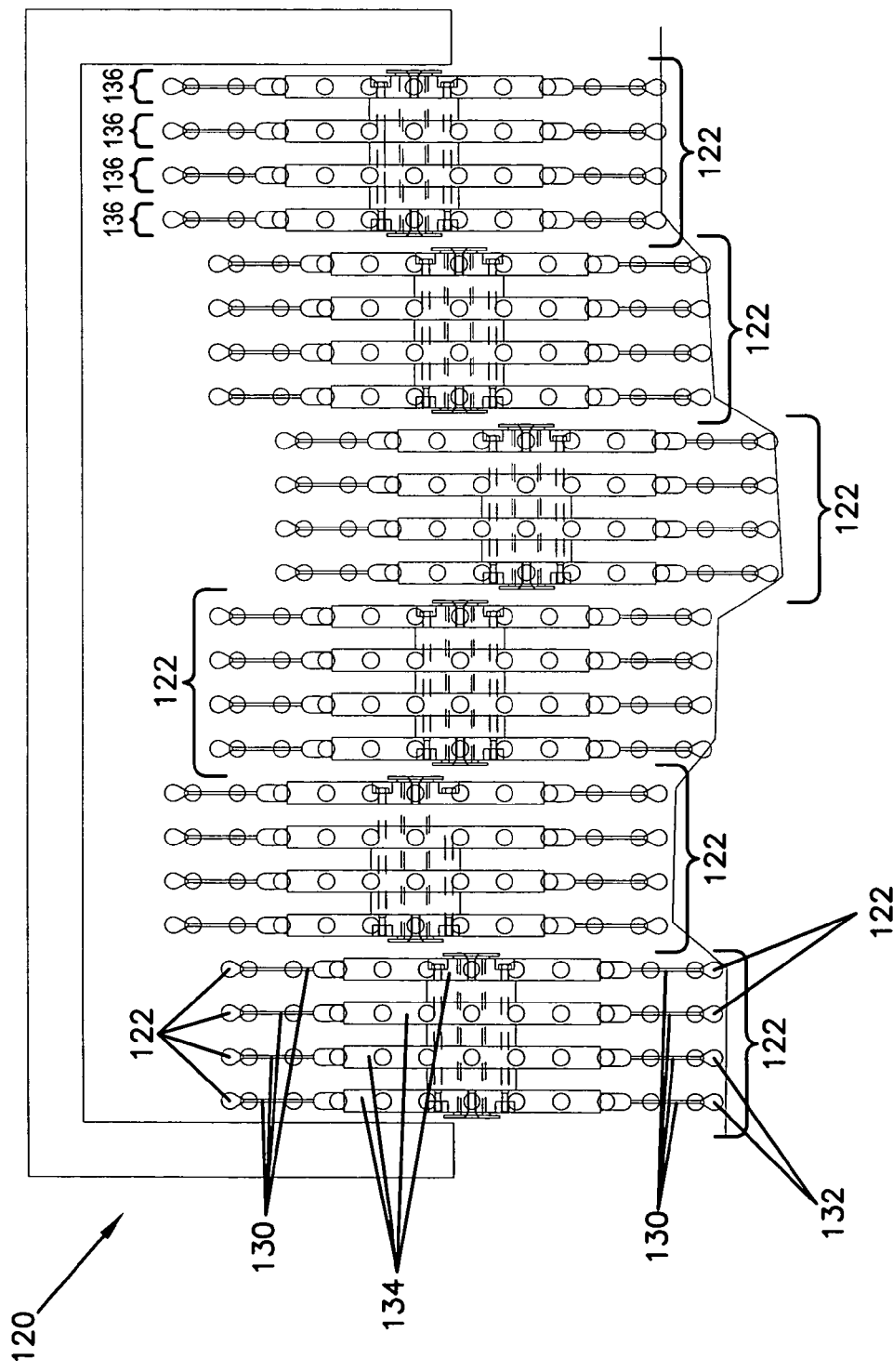
FIG. 10 is a rear elevational view of the article collector assembly for the article collector and separator assembly shown in FIG. 4 with individual drum segments pivoting to follow the contour of uneven terrain.

Referring to FIGS. 5 and 6, the collector assembly segments 136 are mounted to pivot independently of one another on the pivot arms 176. Each assembly segment 136 may have one or more rows of radially extending fingers 130. In the embodiment shown in FIGS. 7-9, each segment 136 includes four rows of fingers 130. With the collector assemblies 122 mounted independent of one another, the pickup fingers 130 more closely follow uneven terrain and better engage and collect fruit and other articles on the ground, as shown in FIG. 10. The individual collector assembly segments 136 may ride into swales and ruts that a solid axle drum extending the length of all of the collector assembly segments may pass over. The collector assembly 122 with multiple segments 136 is particularly suited for collecting articles for operations on uneven terrain.

Figure 4:
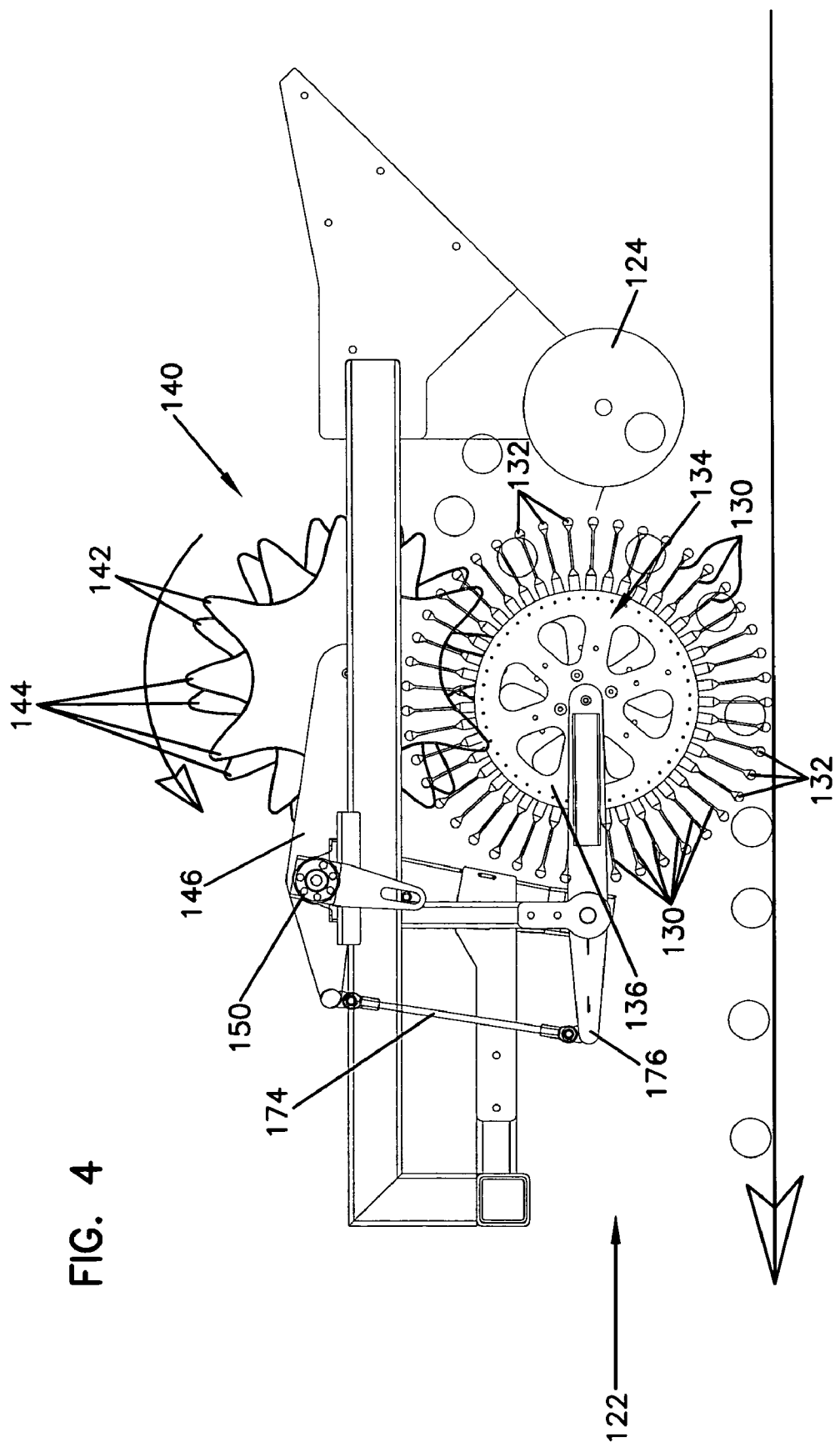
FIG. 4 is a left side elevational view of a first embodiment of an article collector and separator assembly for the article pick up system shown in FIG. 1.

It can be appreciated that the separator assembly 140 must move up and down and maintain its spacing with the associated collector assembly 122. As shown in FIGS. 4-9, the separator assembly 140 includes a separator sprocket 142 with sprocket teeth 144, arm 146 and drive motor 148. The separator assembly 140 and its associated collector assembly 122 are joined by a parallel linkage 174. The parallel linkage mounts between the arms 146 and 176 to maintain the sprocket 142 and the collector drum segment 136 at a constant distance from one another, as shown in FIGS. 4-6. A hydraulic motor may mount to the shaft for the drive members 146 or the separator assemblies 140 may be driven with the collector assemblies 122 and maintained at a constant relative speed. The pivoting of the assemblies 122 and 140 provides for greater contact with the ground, as shown in FIG. 10. As shown in FIG. 5, the parallel linkage 174 allows individual assemblies 122 and 140 to pivot upward from a normal position, as is necessary when a bump or other raised obstruction is encountered. As shown in FIG. 6, the parallel linkage 174 also allows individual assemblies 122 and 140 to pivot downward so that the segments 136 can extend into ruts or crevices.

Figure 13:
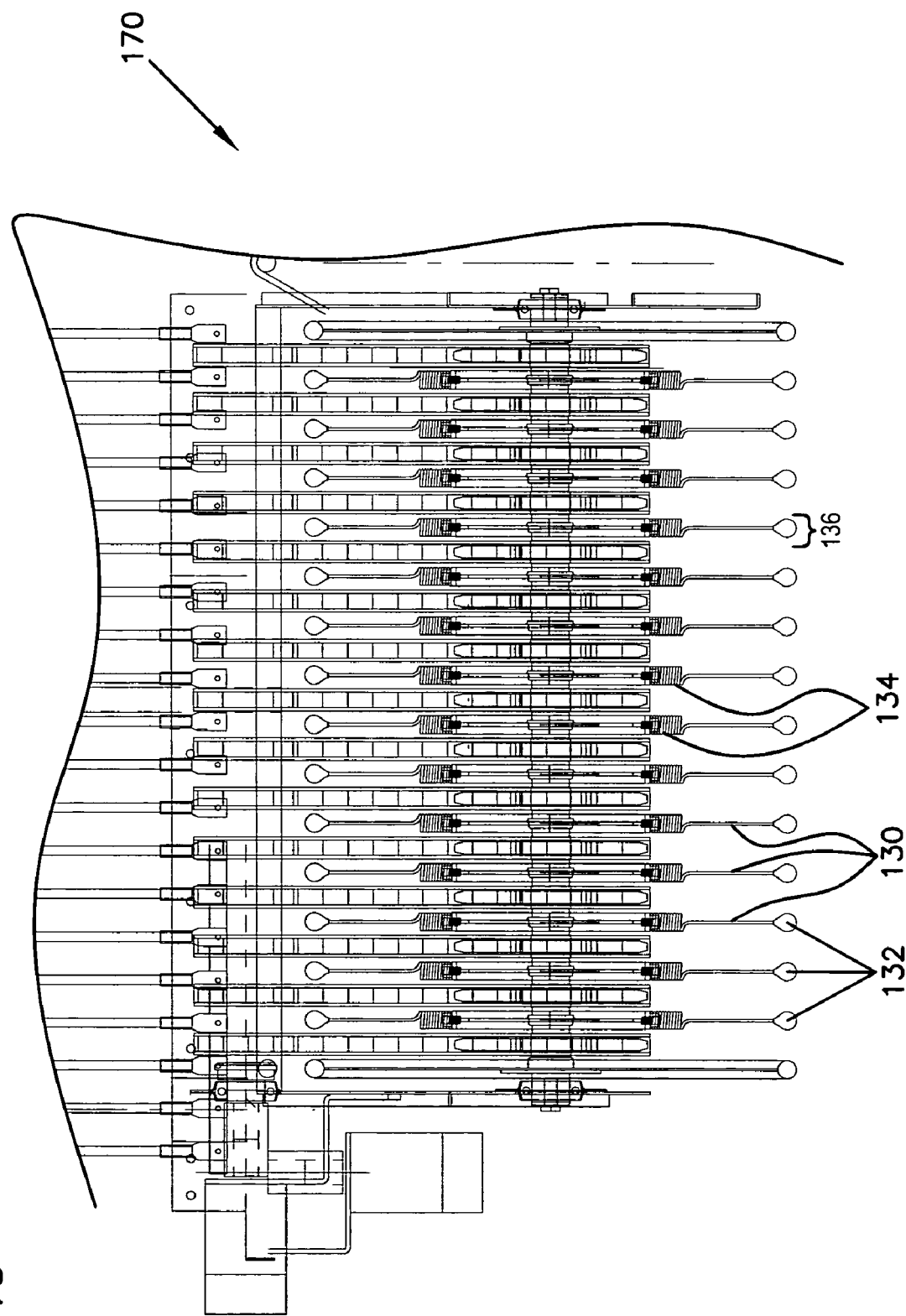
FIG. 13 is a rear elevational view of a second embodiment of a collector assembly for the article pick up system shown in FIG. 1.
Figure 14:
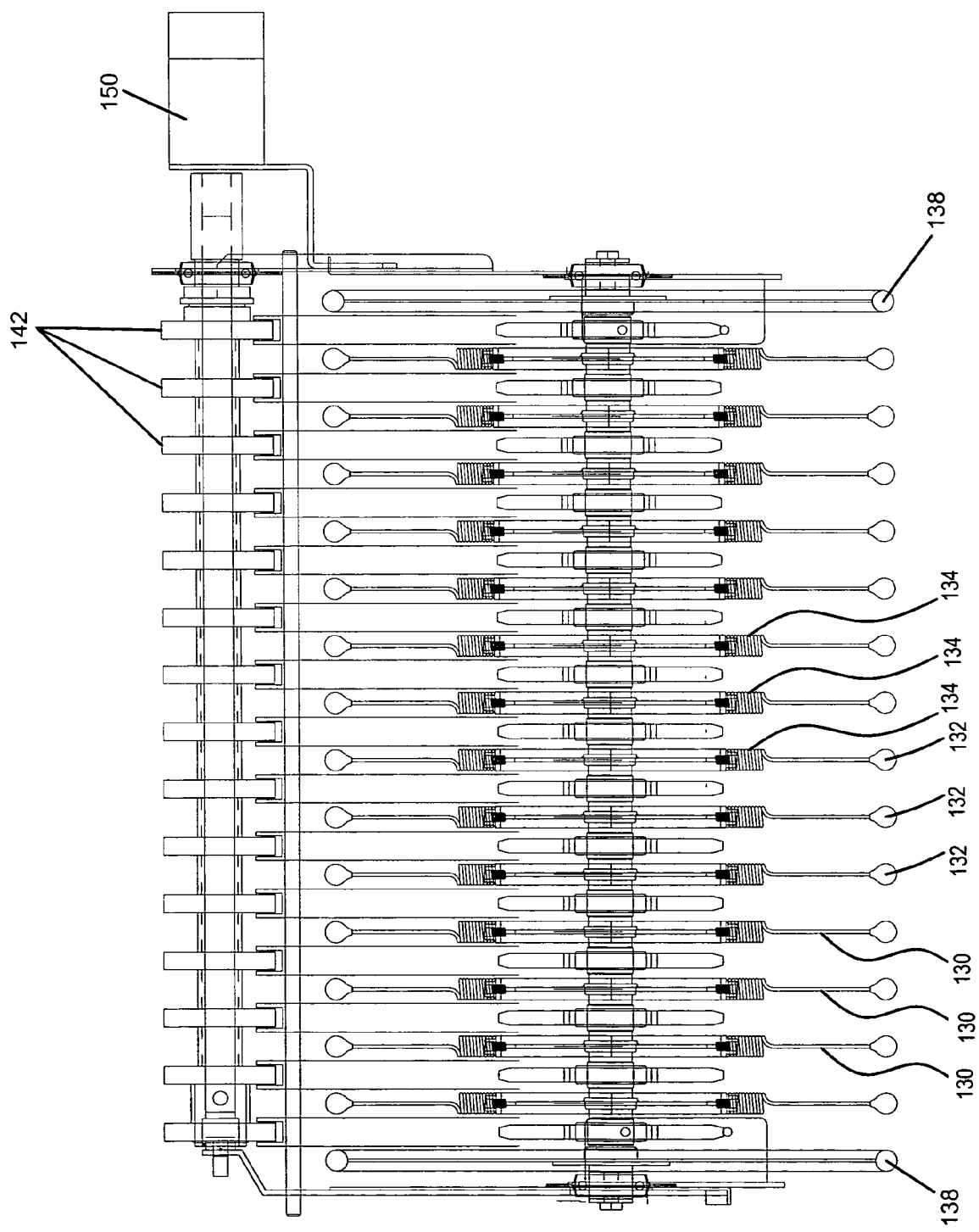
FIG. 14 is a top plan view of the collector assembly shown in FIG. 13.
Figure 18:
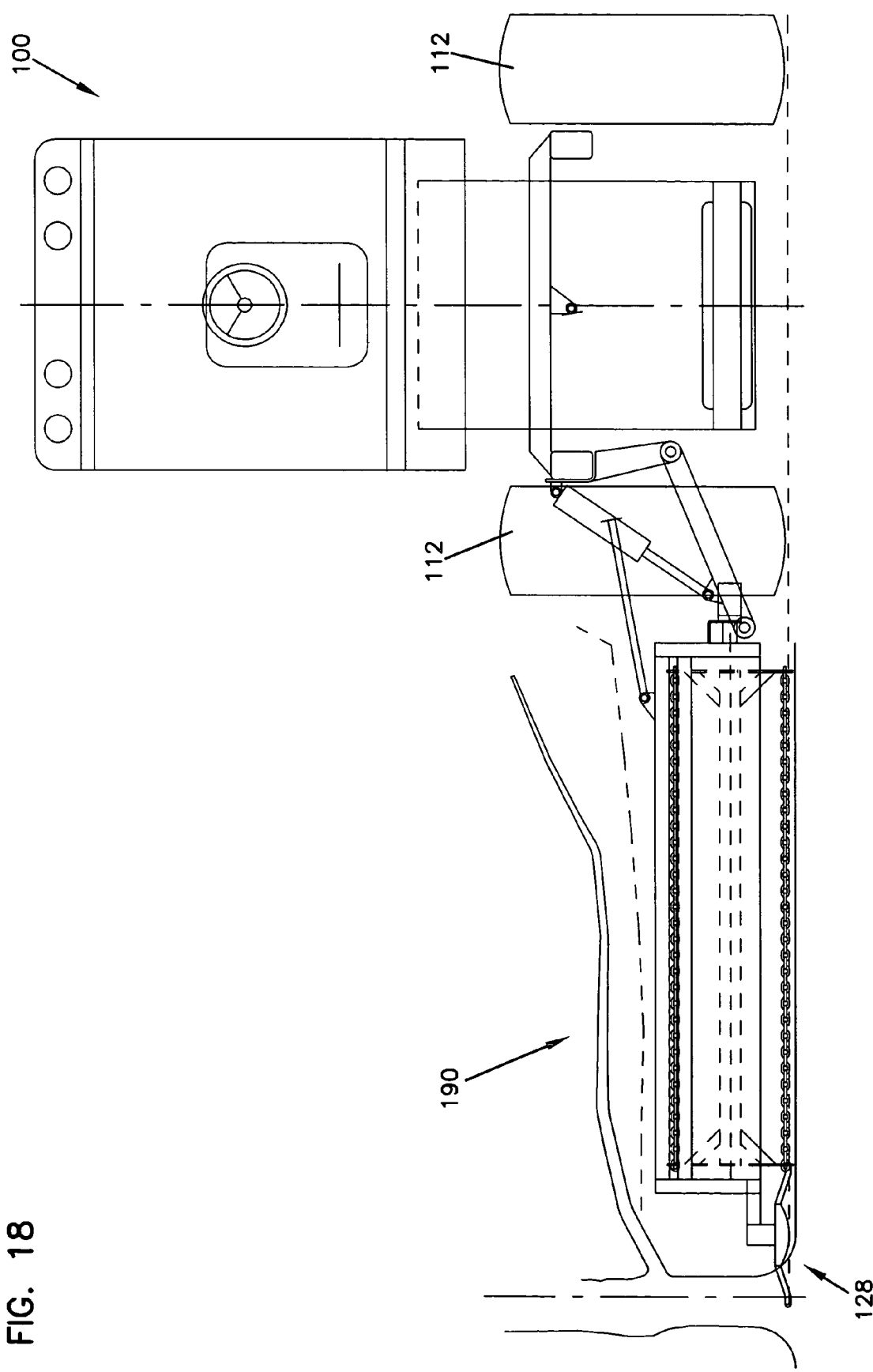
FIG. 18 is a front plan view of an alternate embodiment of an article pick up system shown in a use position.
Figure 19:
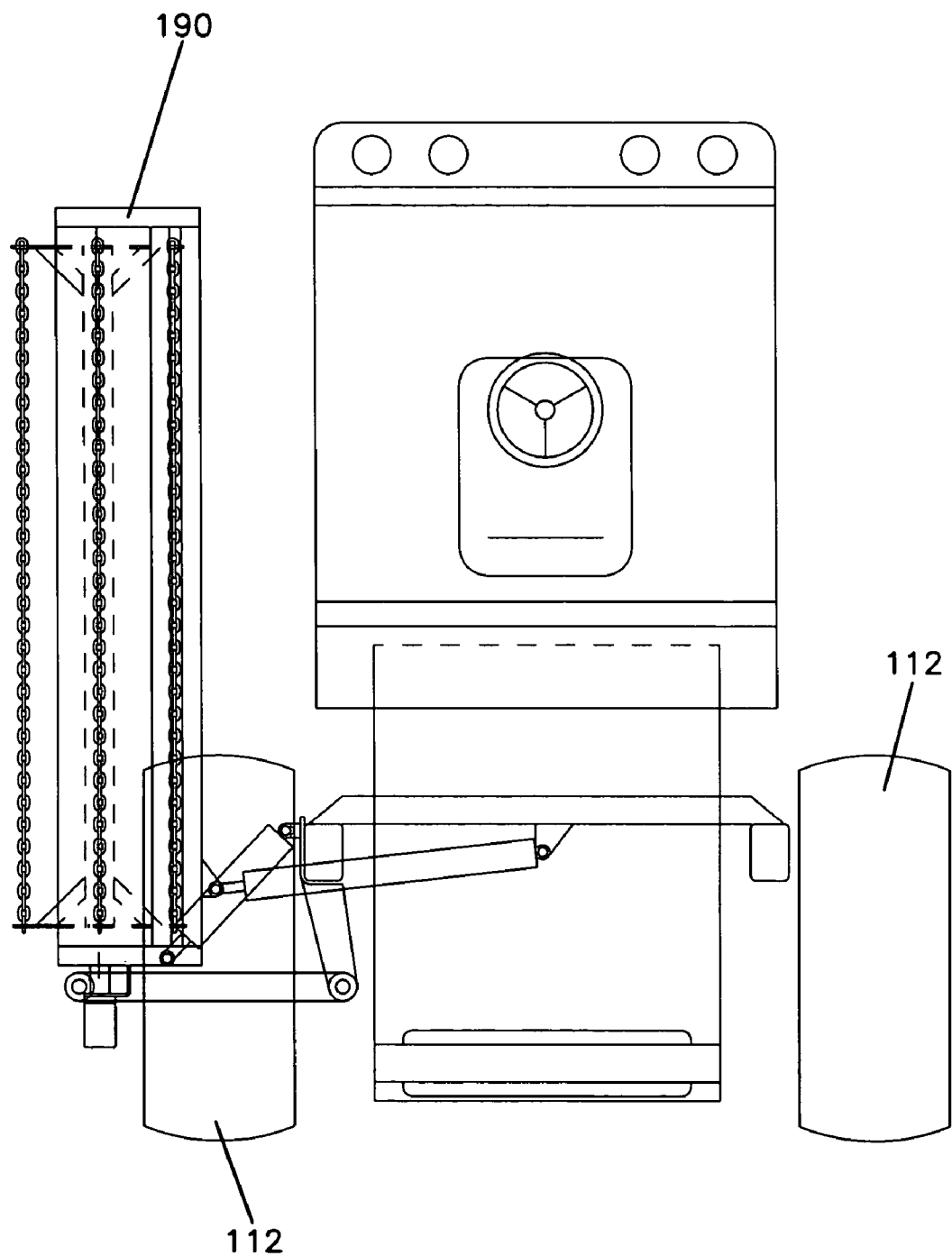
FIG. 19 is a front plan view of the article pick up system shown in FIG. 18 configured in a travel position.

Referring now to FIGS. 13-14, there is shown a second embodiment of a collector assembly, generally designated 200. The collector assembly 200 is similar to collector assembly 122, but the collector assembly 200 mounts all fingers 134 on a single axle rather than having several segments and several pivotally mounted separator assemblies. This eliminates the parallel linkages 174 used in the embodiment shown in FIGS. 4-9 and 11-12. For many applications and terrains, the collector assembly 200 provides more than satisfactory contact and collection efficiency.

Figure 20:
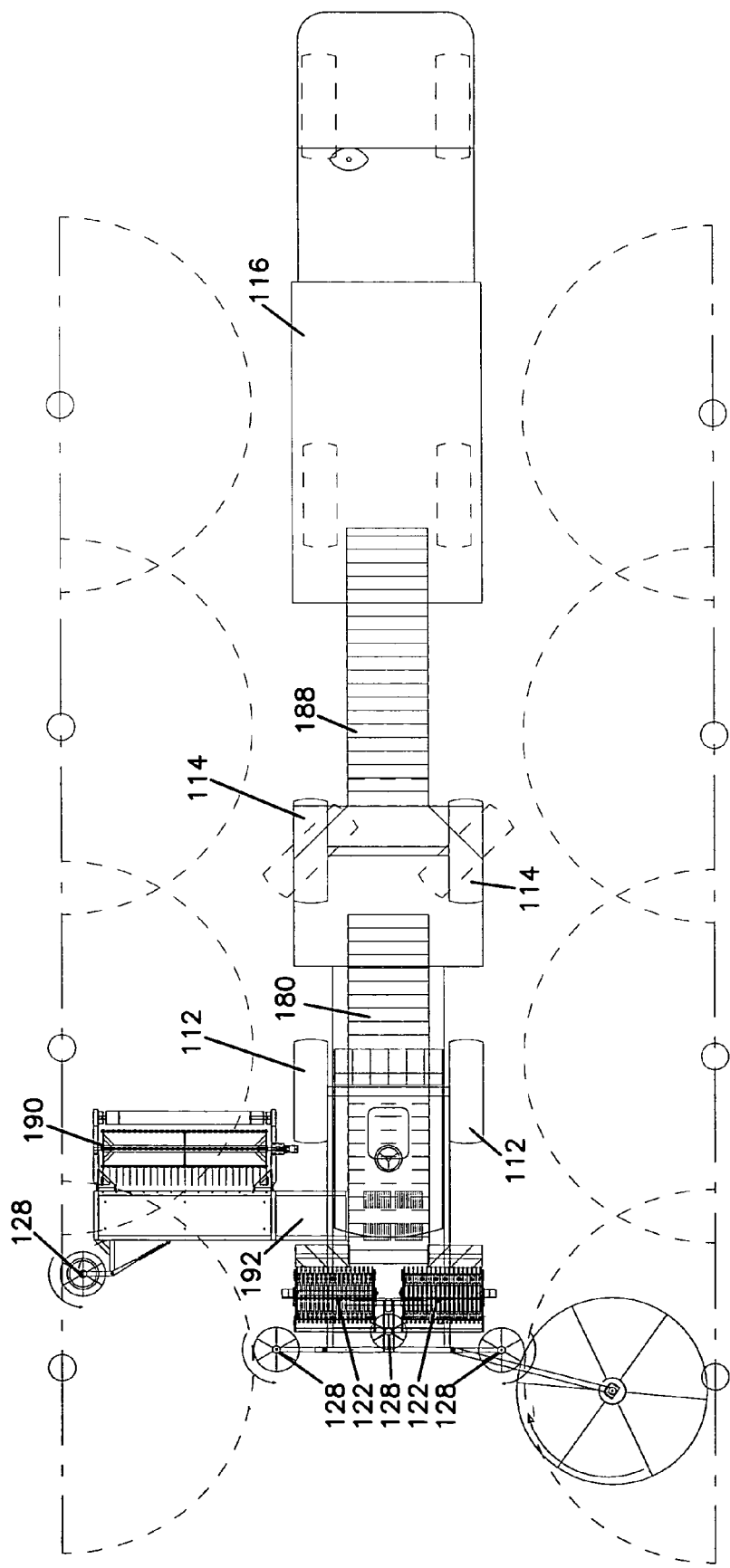
FIG. 20 is a top plan view of the article pick up system shown in FIG. 19.

Referring again to FIGS. 3 and 20, it can be appreciated that the utility of the pickup system 100 is increased if the width of the effective collection path is expanded. For some applications, additional width may be needed than is provided by the aligned primary collector assemblies 122 at the front of the collection vehicle 102. To add to this utility, diverters 128 may be utilized at the ends of the collector assemblies or in between the collector assemblies, as in a second embodiment shown in FIG. 20. For some applications, a side collector assembly 190 may also be employed. The side collector 190 transports collected fruit to the conveyor 180, where it is transported with the fruit collected from the collector assemblies 122. The side collector 190 may be configured in a manner similar to the collector assemblies 122 or may take on a different configuration.

As shown in FIGS. 15-17, sweeper assemblies 150 and 160 may also be utilized with the collector assemblies 122. The sweepers 150 and 160 may be utilized interchangeably with the side collector 190 or as a pair of sweepers 150 or 160. Moreover, it can be appreciated that one or two sweeper systems 150 or 160 may be utilized, depending on the terrain and the application.

Referring now to FIGS. 15 and 16, in a first embodiment of a sweeper, a center hub 152 is mounted on a support assembly 158. Arms 154 extend outward from a center hydraulic motor 155 in a radial configuration. In the embodiment shown, six arms 154 extend outward, but it can be appreciated that more or fewer arms may be utilized depending upon the application. The arms 154 are generally configured to sweep along the ground and move the fruit into the path of the collector assemblies 122. The arms 154 then rise up, as shown by a left arm of FIG. 15. As the arm 154 raises up, the arm disengages and passes over the fruit, thereby leaving the fruit below the raised arm and in the path of the pickup vehicle 102. The fruit is then collected by the collector assemblies 122. The arms 154 may be raised at the predetermined point in a number of different ways. A cam track may also be utilized to raise the arm 154 at the desired location. However, it can be appreciated that the cam mechanism 162 may take on several configurations that raise the arms 154 at a selected release point.

Referring now to FIG. 17, the sweeper may utilize rakes 164, flaps 166 or other structures, such as arcing elements 168 shown in FIGS. 1-3, for improving the engagement with and movement of the fruit to the desired location in the path of the collector assemblies 122. It can be appreciated that with both embodiments, the central hub 152 has a generally rounded bottom surface that allows the sweeper assemblies 150 to float on and maintain sliding contact with the ground. The support assembly 158 includes a series of extendable and retractable hydraulic cylinders. The height and position of the sweeper 150 may be adjusted by the vehicle operator using a joystick to raise, lower, extend or retract the sweeper assemblies 150. In this manner, through longer contact with uneven terrain, a high percentage of fruit is collected.

Figure 21:
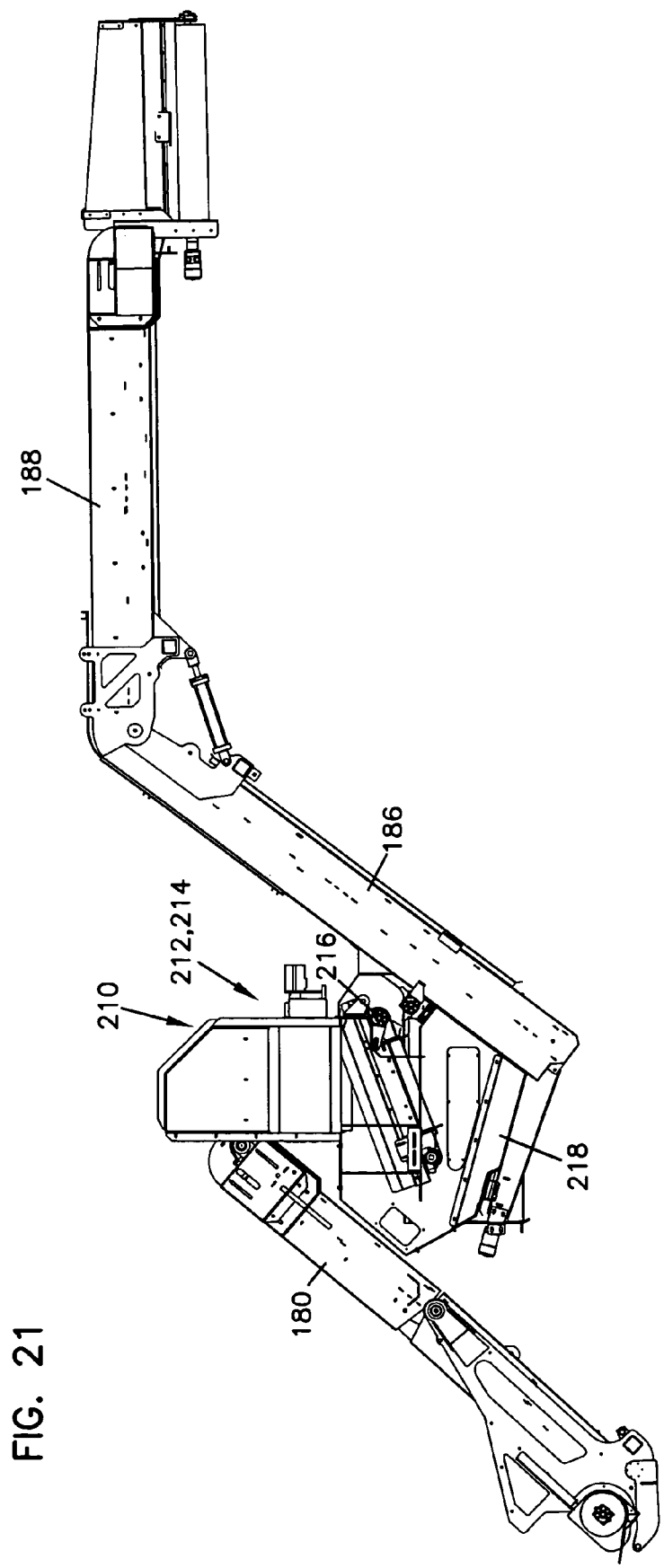
FIG. 21 is a side elevational view of a cleaner assembly for the article pickup system shown in FIG. 1.

Referring now to FIG. 21, there is shown an article cleaning assembly, generally designated 210, for removing debris from the fruit. Such a cleaning assembly is shown in U.S. Pat. No. 7,083,039 to Schloesser and assigned to Oxbo International Corporation of Byron N.Y., incorporated herein by reference. The cleaner assembly 210 generally includes a pair of parallel brushes 212 and 214. The brushes 212 and 214 are elongated and mounted on parallel axes to extend longitudinally along the direction of travel at the upper end of one of the conveyer assemblies 180, 182 or 186, preferably the first conveyor 180. The brushes 212 and 214 are both driven to rotate toward the edge of the harvester 10, generally shown as having the upper portions rotating into the page in FIG. 21. The brushes 212 and 214 include radially extending bristles spaced around the periphery of a center axle and spaced along the length of each of the brushes 212 and 214, substantially covering the exterior surface. The cleaner assembly 210 may also include a cleaner bar generally mounted parallel to the first and second brushes 212 and 214. The cleaner bar and the brushes 212 and 214 are adjustably mounted so that the outer ends of the bristles of the brushes 212 and 214 may encounter more or less contact or resistance. The cleaner 210 is configured so that the articles, such as citrus fruit, fall though the brushes 212 and 214, while the lighter debris, typically twigs and leaves, is flung off over the tops of the brushes 212 and 214. The lighter debris is flung through an opening in the side of the housing while the heavier articles fall through the brushes 212, 214

In one embodiment, a further separator, such as blower and/or a curtain, is below the brushes 212, 214 and removes any remaining debris while allowing the articles to pass to transport devices 216 and 218, which may be configured as augers or conveyors. The fruit is then transported rearward to the transport vehicle 116, shown in FIG. 3.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An article pick up system, comprising:
   a pick up assembly having a plurality of pick up heads extending laterally in a side-by-side configuration and rotating about a substantially horizontal axis, the pick up heads having a plurality of flexible fingers spaced apart about the pick up heads and extending radially outward to engage and pick articles from the ground;
   a release system having separators extending intermediate the flexible fingers and engaging and removing articles from the flexible fingers of the pick up assembly;
   a conveying system for conveying articles from the release system;
   wherein the pick up heads are pivotally mounted about an axis spaced apart from the pick up heads; and
   a sweeper extending laterally from the pick up assembly, wherein the sweeper comprises a rotating arm mounted so as to precede the pick up assembly as the article pick up system advances.

2. An article pick up system according to claim 1, wherein the article pick up system comprises a sweeper extending from each side of the article pick up system.

3. An article pick up system according to claim 1, wherein the rotating arm rotates in a plane substantially parallel to the ground.

4. An article pick up system according to claim 3, wherein the sweeper comprises a center hub sliding on the ground.

5. An article pick up system according to claim 3, wherein the sweeper comprises a lift device for raising the rotating arm to release articles swept by the arm in the path of the pick up heads.

6. An article pick up system according to claim 4, wherein the sweeper comprises a lift device for raising the rotating arm to release articles swept by the rotating arm in the path of the pick up heads.

7. An article pick up system according to claim 6, further comprising a second sweeper extending from an opposite side of the pick up system.

8. An article pick up system according to claim 1, further comprising a cleaner for separating debris from the articles.

9. An article pick up system according to claim 1, wherein the separators comprise rotating separator members extending intermediate the flexible fingers.

10. An article pick up system according to claim 9, wherein the rotating separator members rotate about a separator axis parallel to a rotational axis of the rotating pick up heads.

11. An article pick up system according to claim 10, wherein the rotating separator members are mounted on a linkage connected to the rotating pick up heads, wherein the linkage maintains a constant distance between the separator axis and the axis of the rotating pick up heads.

12. An article pick up system according to claim 10, wherein each of the separator members includes radially extending teeth.

13. An article pick up system comprising:
    a plurality of collector assemblies, each of the collector assemblies having a plurality of pick up heads extending laterally in a side-by-side configuration configured for picking up articles from the ground, wherein each of the collector assemblies pivots independently;
    a release system for removing articles from the collector assembly;
    a conveying system for conveying articles from the release system;
    wherein the pick up heads are pivotally mounted about an axis spaced apart from the pick up heads; and
    wherein each of the pick up heads comprises:
       an arm pivotally mounted to a framework;
       a drum mounted to the arm and rotating about a first substantially horizontal axis;
       a plurality of flexible pick up members extending radially outward from the drum and having widened end portions, the pick up members spaced apart around and along the drum so as to engage and retain articles between the pick up members as the collector assembly advances.

14. An article pick up system according to claim 13, wherein the release system comprises an article release assembly mounted on a parallel linkage to an associated collector assembly.

15. An article pick up system comprising:
    a plurality of collector assemblies, each of the collector assemblies having a plurality of pick up heads extending laterally in a side-by-side configuration configured for picking up articles from the ground;
    a release system for removing articles from the collector assembly:
    a conveying system for conveying articles from the release system:
    wherein the pick up heads are pivotally mounted about an axis spaced apart from the pick up heads; and
    wherein each of the pick up heads comprises:
       an arm pivotally mounted to a framework;
       a drum mounted to the arm and rotating about a first substantially horizontal axis;
       a plurality of flexible pick up members extending radially outward from the drum and having widened end portions, the pick up members spaced apart around and along the drum so as to engage and retain articles between the pick up members as the collector assembly advances;

wherein the release system comprises a rotating element associated with each of the drums of the collector assemblies and configured to engage and remove articles retained by the flexible fingers of the collector assemblies.

16. An article pickup system according to claim 15, wherein the release system is pivotally connected to an associated collector assembly to maintain a constant distance between the drum and the rotating element.

17. An article pickup system according to claim 15, wherein the rotating element comprises a sprocket.

18. A pick up system comprising:
a framework;
a plurality of laterally aligned collector assemblies mounted to the framework, wherein each of the collector assemblies pivots independently;
wherein each of the collector assemblies comprises:
an arm pivotally mounted to the framework;
a drum mounted to the arm and rotating about a first substantially horizontal axis;
a plurality of flexible pick up members having widened extended ends and extending radially outward from the drum, the pick up members spaced apart around and along the drum so as to flex apart to engage and retain articles between the pick up members as the collector assembly advances;
a separator assembly mounted to the framework and engaging articles retained between the flexible pick up members for removing articles from the collector assemblies.

19. An article pick up system according to claim 18, wherein each of the collector assemblies comprises a plurality of heads mounted on the arm.

20. An article pick up system according to claim 18, wherein the separator assembly is mounted on a parallel linkage to an associated one of the collector assemblies.

21. An article pick up system comprising:
a framework;
a plurality of laterally aligned collector assemblies mounted to the framework;
wherein each of the collector assemblies comprises:
an arm pivotally mounted to the framework;
a drum mounted to the arm and rotating about a first substantially horizontal axis;
a plurality of flexible pick up members having widened extended ends and extending radially outward from the drum, the pick up members spaced apart around and along the drum so as to flex apart to engage and retain articles between the pick up members as the collector assembly advances;
a separator assembly mounted to the framework and engaging articles retained between the flexible pick up members for removing articles from the collector assemblies, wherein the separator assembly comprises a rotating element associated with each of the plurality of collector assemblies, wherein the rotating elements extend proximate the drums to engage and remove articles retained by the collector assemblies.

22. An article pick up system comprising:
a framework;
a plurality of laterally aligned collector assemblies mounted to the framework;
wherein each of the collector assemblies comprises:
an arm pivotally mounted to the framework;
a drum mounted to the arm and rotating about a first substantially horizontal axis;
a plurality of flexible pick up members having widened extended ends and extending radially outward from the drum, the pick up members spaced apart around and along the drum so as to flex apart to engage and retain articles between the pick up members as the collector assembly advances;
a separator assembly mounted to the framework and engaging articles retained between the flexible pick up members for removing articles from the collector assemblies, wherein the separator assembly is pivotally connected to an associated one of the collector assemblies to maintain a constant distance between the associated one of the collector assemblies and the separator assembly.

23. An article pickup system comprising:
a framework;
a plurality of laterally aligned collector assemblies mounted to the framework;
wherein each of the collector assemblies comprises:
an arm pivotally mounted to the framework;
a drum mounted to the arm and rotating about a first substantially horizontal axis;
a plurality of flexible pick up members having widened extended ends and extending radially outward from the drum, the pick up members spaced apart around and along the drum so as to flex apart to engage and retain articles between the pick up members as the collector assembly advances;
a separator assembly mounted to the framework and engaging articles retained between the flexible pick up members for removing articles from the collector assemblies;
wherein the separator assembly comprises a rotating sprocket.

24. A pick up and cleaning system, comprising:
a pick up device having a plurality of heads rotating about a substantially horizontal axis and extending laterally in a side-by-side configuration picking up articles from the ground as the pick up and cleaning system advances over the ground, wherein each of the heads includes a plurality of flexible fingers having widened ends and extending radially outward from the heads;
a release system for removing articles from the pick up device;
a conveying system for conveying articles from the release system;
a debris cleaner for separating debris from the articles conveyed from the release system comprising a first rotating brush and a second rotating brush spaced apart from the first rotating brush and parallel to the first rotating brush, wherein transported articles fall onto the release system and pass downward intermediate the first and second rotating brushes, and wherein the debris falls onto the separator assembly and passes over the rotating brushes and is separated from the transported articles.

25. A pick up and cleaning system according to claim 24, wherein the release system comprises a rotating element associated with each pick up device engaging and removing articles retained by the pick up device.

26. A pick up and cleaning system according to claim 25, wherein each pick up device head comprises a rotating drum, and wherein the release system is pivotally connected to an associated pick up device to maintain a constant distance between the drum and the rotating element.

27. A pick up and cleaning system comprising:
- a pick up device having a plurality of heads rotating about a substantially horizontal axis and extending laterally in a side-by-side configuration picking up articles from the ground as the pick up and cleaning system advances over the ground, wherein each of the heads includes a plurality of flexible fingers having widened ends and extending radially outward from the heads;
- a release system for removing articles from the pick up device;
- a conveying system for conveying articles from the release system;
- a debris cleaner for separating debris from the articles conveyed from the release system;
- a first sweeper extending laterally from a first side of the pick up device and a second sweeper extending laterally from a second side of the pick up device.

* * * * *